United States Patent [19]

Matsuoka

[11] 4,154,682
[45] May 15, 1979

[54] MAGNETIC SETTLER FILTER

[76] Inventor: Kaichiro Matsuoka, 13-4 Komagome 4-chome, Toshimaku, Tokyo, Japan

[21] Appl. No.: 898,842

[22] Filed: Apr. 20, 1978

Related U.S. Application Data

[63] Continuation-in-part of Ser. No. 760,669, Jan. 19, 1977, abandoned.

[30] Foreign Application Priority Data

Jan. 21, 1976 [JP] Japan ................................. 51/4504

[51] Int. Cl.² ........................................... B01D 35/06
[52] U.S. Cl. ................................................... 210/222
[58] Field of Search .............................. 210/222, 223; 209/223 A, 223 R, 232

[56] References Cited

U.S. PATENT DOCUMENTS

| | | | |
|---|---|---|---|
| 2,437,681 | 3/1948 | Crockett et al. | 209/232 |
| 3,042,211 | 7/1962 | El-Hindi | 210/222 |
| 3,476,232 | 11/1969 | Merwin et al. | 210/222 |
| 3,487,939 | 1/1970 | Keeley | 210/222 |
| 3,834,542 | 9/1974 | Linstruth | 210/222 |

Primary Examiner—Theodore A. Granger
Attorney, Agent, or Firm—Haseltine, Lake & Waters

[57] ABSTRACT

A magnetic settler filter comprising a magnet plate disposed in a lower portion of a liquid tank. Liquid containing magnetic powder is caused to flow into the tank and along the underside of the magnet plate, and then it flows along the upper surface of the magnet plate. The magnetic powder is attracted to the upper and lower surface of the magnet plate and is collected by a scraper and fed outside the tank.

6 Claims, 6 Drawing Figures

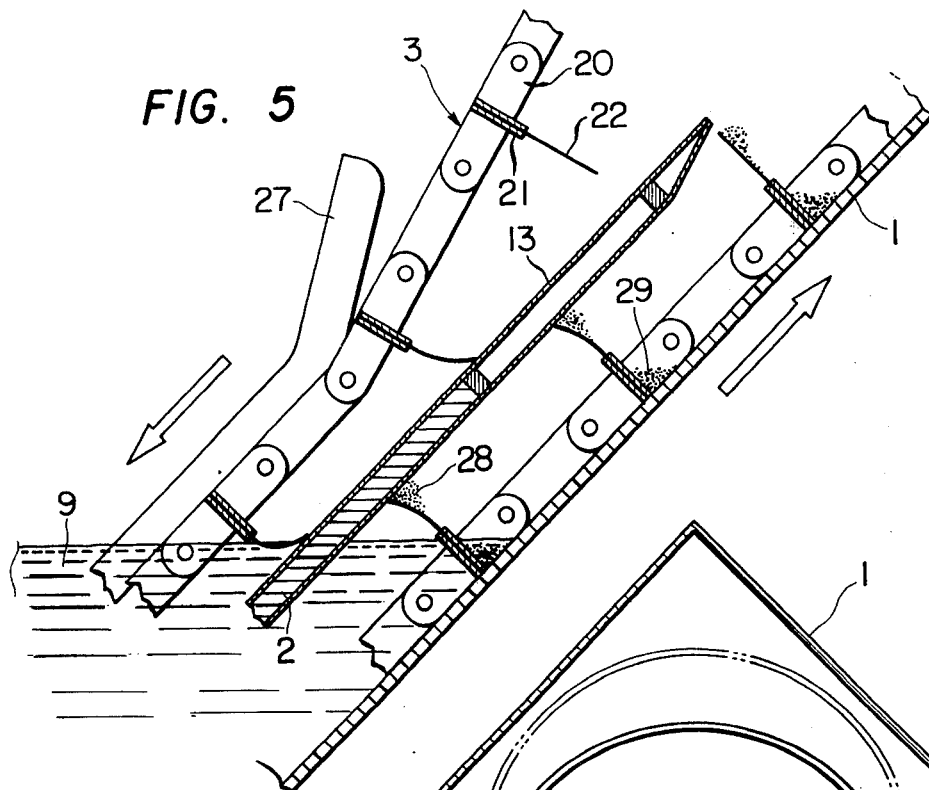
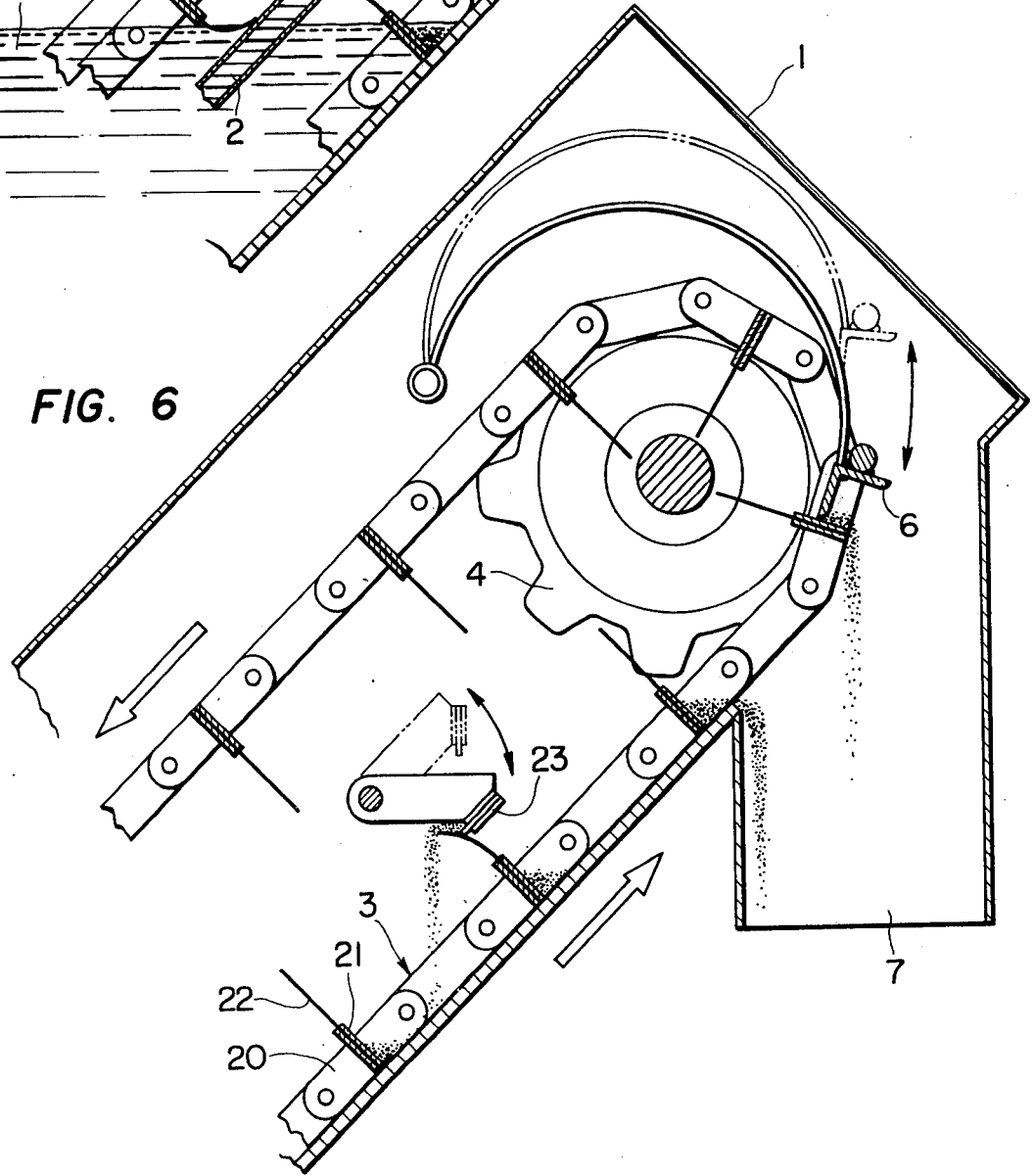

016_4,154,682

MAGNETIC SETTLER FILTER

BACKGROUND OF THE INVENTION

This application is a Continuation-In-Part of the parent application Ser. No. 760,669 filed Jan. 19, 1977, now abandoned.

FIELD OF THE INVENTION

This invention relates to a magnetic settler filter for separating magnetic powder, such as, iron powder from a liquid containing the magnetic powder.

PRIOR ART

The conventional magnetic separators serve to separate magnetic powder from a liquid with a magnet attracting the magnetic powder. The magnet is in the form of a drum whose lower half is immersed in a tank containing the liquid. Therefore, the opposite pole surfaces of the upper half and the magnetic pole surface of the inner surface of the lower half of the drum magnet are not utilized. Only the magnetic pole surface of the outer surface of the lower half is used, and hence the magnetic pole surface of the magnet is not effectively utilized. Furthermore, since the magnet upwardly attracts the magnetic powder which tends to settle downwardly by gravity, a large force of attraction is required.

SUMMARY OF THE INVENTION

An object of the invention is to provide a magnetic settler filter, which effectively utilizes the magnetic pole surfaces of the magnet and permits effective separation of the magnetic powder from the liquid without requiring a great attraction force for the magnet.

According to the invention, the magnetic powder is attracted to both the upper and lower surfaces of a magnet plate, thus permitting all of the magnetic pole surfaces to be utilized. Above the magnet plate, the direction of attraction and the direction of settling due to gravitational forces are the same, so that the action of gravity on the magnetic powder supplements the attraction by the magnetic plate and efficiently separates the magnetic powder from the liquid without requiring a large attraction force for the magnet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a side elevation view of the other end of a magnet plate; and

FIG. 6 is a side elevation view of scrapers and a sludge discharge outlet.

DESCRIPTION OF THE PREFERRED EMBODIMENTS

Figure 1:
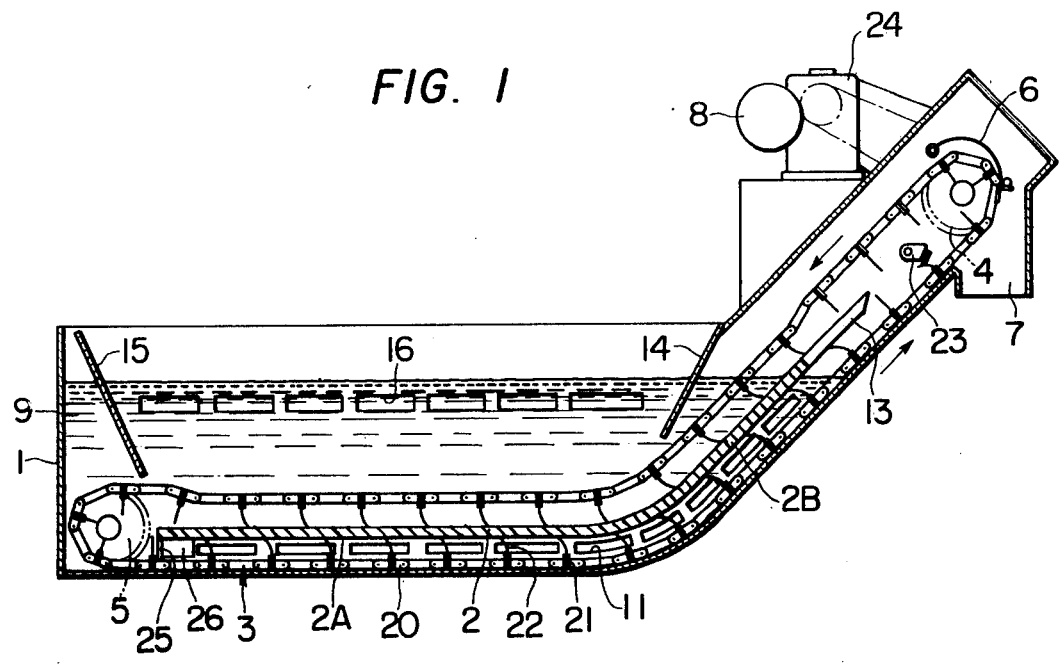
FIG. 1 is a side elevation view in section of an embodiment according to the invention.
Figure 3:
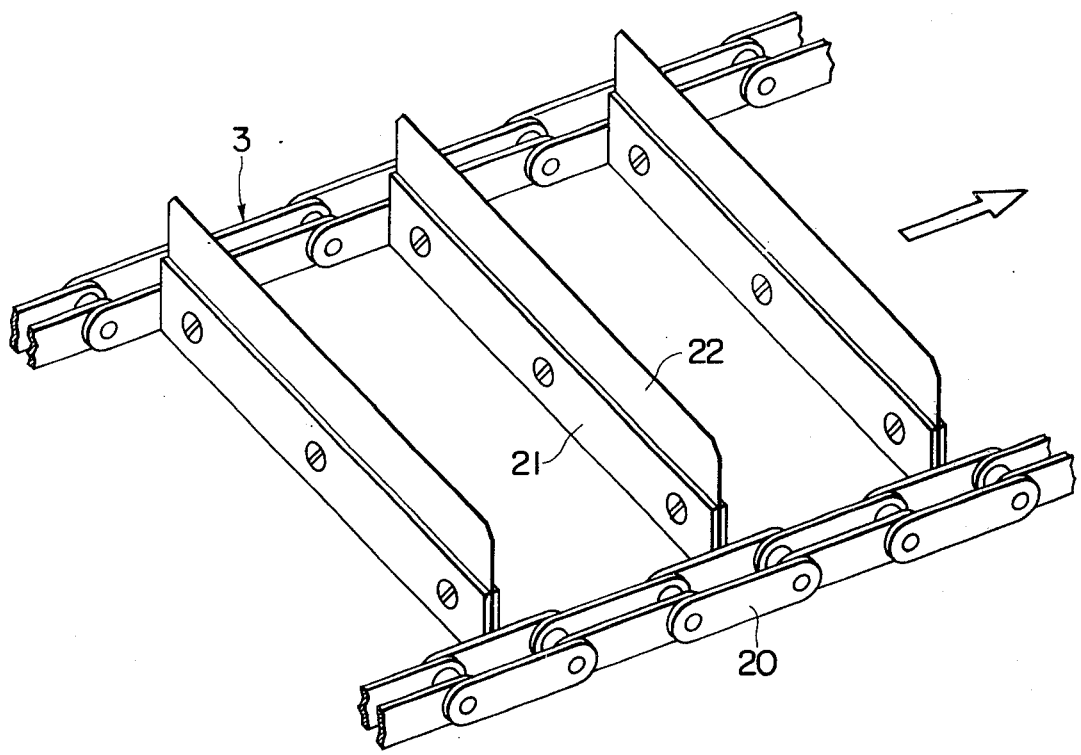
FIG. 3 is an isometric view of a scraper conveyor.

Referring to the drawings, therein is seen a tank 1 for a liquid containing magnetic powder and a magnet plate 2 disposed in a lower portion of a tank 1. The magnet plate 2 consists of a horizontal portion 2A and an upwardly inclined portion 2B, the upward end of which is above the liquid level. The magnet plate 2 is magnetized such that its upper surface constitutes one pole and its lower surface the other pole. A scraper conveyor 3 is provided for collecting and conveying magnetic powder attracted to the upper and lower surfaces of the magnet plate 2 and for removing settled foreign matter outside the tank. The conveyor 3 is endless and is wound on conveyor sprockets 4 and 5. As shown in FIG. 3, the scraper conveyor 3 consists of conveyor chains 20, nonmagnetic freight bars 21, both ends of which are fixed to the conveyor chains 20, and nonmagnetic and flexible scraper plates 22 which are mounted on the freight bars 21. The magnetic powder and foreign matter conveyed by the scraper conveyor 3 are scraped therefrom by scrapers 6 and 23 and are discharged from a sludge discharge outlet 7. The scraper conveyor 3 is driven in the counter-clockwise direction in FIG. 1 continuously or intermittently by a conveyor drive motor 8 through a reduction device 24 connecting the sprocket 4 with motor 8. The intermittent drive may be preferable when the quantity of the magnetic powder is small.

Figure 2:
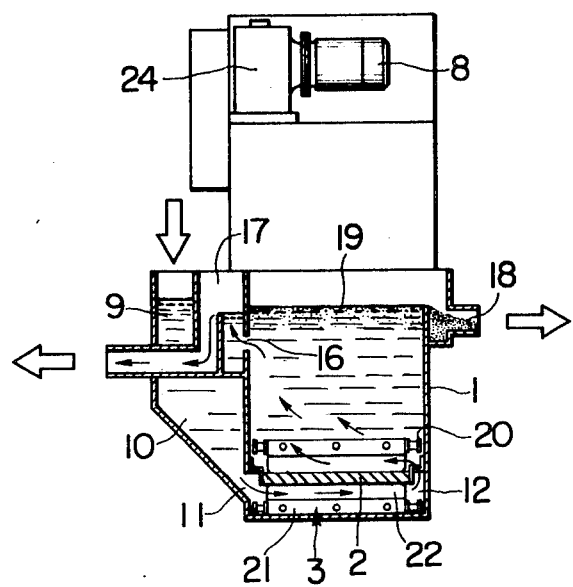
FIG. 2 is a transverse sectional view taken through the embodiment in FIG. 1.

The tank 1 is provided with an inlet chamber 10 (FIG. 2) through which liquid 9 containing magnetic powder flows into the tank 1. The liquid 9 in the inlet chamber 10 flows through a liquid inlet 11 near the bottom of the tank 1 into a portion below the magnet plate 2. The liquid inlet 11 comprises many square openings. A liquid passage 12 connecting portions above and below the magnet plate 2 is formed on the side of the magnet plate 2 opposite the liquid inlet 11 (FIG. 2).

Figure 4:
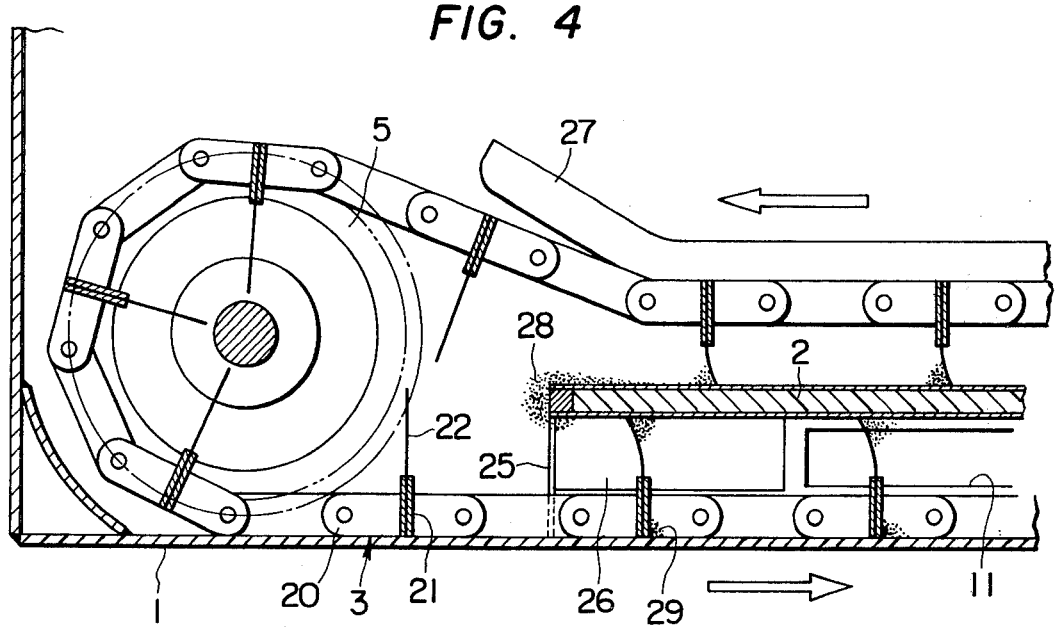
FIG. 4 is a side elevational view of an end of a magnet plate.

A baffle plate 13 is connected solidly with the upward end of the magnet plate 2 and is formed with the nonmagnetic plates. Baffle plates 14 and 15 are disposed in the tank 1 and a liquid outlet 16 comprising a plurality of square openings is provided leading to an outlet chamber 17 for liquid from which the magnetic powder has been separated. A discharge outlet 18 is provided at the other side of the tank 1 for removal of floating sludge 19. 25 and 26 (FIG. 4) denote baffle plates for preventing the liquid from escaping through above the conveyor chains 20 toward the sprocket 5. 27 (FIG. 4 and 5) denotes a guide for the chains 20.

The liquid 9 flowing into the inlet chamber 10 from the outside flows from the liquid inlet 11 into the portion below the magnet plate 2 and along the underside of the magnet plate 2. The magnetic powder contained within the liquid 9 is attracted to the underside of the magnet plate 2, and heavy foreign matter settles to the bottom of the liquid tank 1. The liquid 9 flowing through the liquid passage 12 to the portion above the magnet plate 2 flows along the upper surface of the magnet plate 2, and during this time the magnetic powder is attracted to the magnet plate 2. The magnetic powder contained in the liquid 9 above the magnet plate 2 also settles on the upper surface of the magnet plate 2 by gravity. The clean liquid after removal of the magnetic powder flows from the liquid outlet 16 located slightly below the surface of the liquid to the outlet chamber 17 and therefrom to the outside. Meanwhile, the sludge 19 floating on the liquid 9 is discharged from the discharge outlet 18 as it is collected at the surface of the liquid.

The magnetic powder 28 attracted to the upper surface of the magnet plate 2 is conveyed to the left end (see FIG. 4) of the magnet plate 2 by the scraper plates 22 of the scraper conveyor 3 sliding on the upper surface thereof and is directed to the lower surface of the left end of the plate 2 by the magnetic attraction force of the lower surface. The magnetic powder 28 attracted on the lower surface of the plate 2 is conveyed toward the right by the scraper plates 22. At the same time the foreign matter 29 settled on the bottom of the tank 1 is carried along by the push of the freight bars 21 sliding on the bottom thereof. At the baffle plate 13, as shown in FIG. 5, the most part of the magnetic powder 28 falls on the upwardly inclined bottom of the tank 1, being released from the magnetic attraction. The balance is conveyed, adhering to the scraper plates 22, and thereafter is scraped off therefrom by the scraping 23 as shown in FIG. 6. The magnetic powder and foreign matter carried by the freight bars 21 drop from the sludge discharge outlet 7 to the outside, and the material adhering to the freight bars 21 is scraped off by the scraper 6 to be discharged from the outlet 9.

While the direction of attraction and gravitational direction are opposite to each other below the magnet plate 2, the magnetic powder precipitated by gravity is separated from the liquid 9 as it is transferred by the scraper conveyor 3. Above the magnet plate 2, the direction of attraction and direction of settling by gravity are the same, so that the force of attraction of the magnet plate 2 and the gravitational force both act in the direction for separating the magnetic powder from the liquid 9.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalents of the following claims.

What I claim is:

1. A magnetic settler filter apparatus comprising: a tank for receiving liquid containing magnetic powder to be separated from the liquid; a magnetized plate spaced above the bottom of said tank and magnetized so that upper and lower surfaces of said magnetized plate attract magnetic powder, said magnetized plates having width and length; liquid inlet means located at the side of one edge of said width for directing flow of incoming liquid into a portion of said tank below said magnetized plate; liquid passage means located at a side of the other edge of said width for liquid flow along underside of said magnetized plate to a portion above said magnetized plate; liquid outlet means for discharging clean liquid at a level; sludge discharge outlet means located above the level of said liquid outlet means for discharging collected magnetic powder; scraper conveyor means movable in the length direction of said magnetized plate from one end to the other end underneath said magnetized plate and further to said sludge outlet means and being also movable in opposite length direction of said magnetized plate from said sludge discharge outlet means through said other end of said magnetized plate to said one end above said magnetized plate; said scraper and converyor means comprising endless conveyor chains; freight bars fastened at both ends to said conveyor chains; scraper plates mounted on said freight bars being slidable on bottom of said tank, said scraper plates being slidable on upper and lower surfaces of said magnetized plate.

2. A filter as defined in claim 1 wherein said magnetized plate comprises a horizontal portion and an upwardly inclined portion, said upward portion ending above the liquid level in said tank.

3. A filter as defined in claim 2 comprising scraper means for removing powder and foreign matter from said freight bars and said scraper plates.

4. A filter as claimed in claim 1 comprising sprockets on which said conveyor means is wound for being driven in one direction below said magnetized plate and in the opposite direction above said magnetized plate.

5. A filter as claimed in claim 4 wherein: said tank has liquid outlet means below the level of liquid in said tank and above said magnetized plate for discharge of liquid from which magnetic powder and foreign matter have been removed.

6. A filter as claimed in claim 5 wherein: said scraper conveyor means comprises a horizontal portion at the opposite surfaces of said magnetized plate and an upwardly inclined portion extending from said horizontal portion to said sludge discharge outlet means.

* * * * *